Nov. 4, 1969 J. A. ERDLE 3,476,871

LAMINATED ELECTRICAL BUS BAR

Filed May 29, 1967

INVENTOR.
JACK A. ERDLE

BY

ATTORNEY

United States Patent Office 3,476,871
Patented Nov. 4, 1969

3,476,871

LAMINATED ELECTRICAL BUS BAR

Jack A. Erdle, 221 Georgian Court Road, Brighton, N.Y. 14610

Filed May 29, 1967, Ser. No. 641,868
Int. Cl. H02g *15/08*
U.S. Cl. 174—88 4 Claims

ABSTRACT OF THE DISCLOSURE

The superposed conductors in each of a plurality of laminated bus bars are offset from one another along the length of the bar, to provide a flared portion, which intermeshes with a like portion of another bar, and which is secured to the other bar by a stud which passes through registering openings in the meshed portions without engaging the conductors. One side only of each of the meshed ends of the conductors is free of insulation to form thereon a contact surface which is in electrical contact with a like surface on one of the adjacent conductors. The conducting portions of each bar are interleaved with conducting portions on another bar with insulation separating the conducting portions of one bar from the conducting portions of the other bar.

This invention relates to electrical bus bars, and more particularly to bus bars of the type that are manufactured by laminating thin strips of copper between thin strips of insulation.

Laminated bus bars have been used extensively in the wiring of modular and panel type electronic systems. The bars are usually made up of strips of flat, ribbon-like conductors separated by substantially coextensive strips of insulating material. Known such bars have been provided with relatively thin integral connector terminals, which project from the individual conductors at intervals along their lengths for connecting various other circuit components to the conductors at convenient points therealong, see, for example, my U.S. Letters Patent No. 3,264,403, granted Aug. 2, 1966.

There are many instances, as in the case of particularly large electronic systems, in which it is desirable or necessary to employ many intersecting bus bar connections to carry relatively heavy loads to remote points in a system, and to make the most efficient use of the space available. Heretofore there has been no relatively simple and reliable means for making such connections.

It is an object of this invention to provide an improved laminated bus bar system, which is substantially more versatile than prior, like systems.

Another object of this invention is to provide improved means for connecting intersecting laminated bus bars of the type described.

More specifically it is an object of this invention to provide an improved laminated bus bar which is particularly suited for connection to another, like bar.

Other objects of the invention will be apparent hereinafter from the specification, and from the recital of the appended claims, particularly when read in conjunction with the accompanying drawing.

SUMMARY OF THE INVENTION

These objects are achieved by manufacturing laminated bus bars having flared or furcated ends so that registering ends of the superposed conductors in each bar are spaced or offset from one another to mesh with a like, flared end of another bar. One side only of each of the offset ends of the conductors in a bar is free of insulation to provide thereon a contact surface which is adapted to engage and be in electrical contact with a like surface on one of the conductors in the bar meshed therewith. The meshed ends of a pair of bars are secured together by a screw which passes through registering openings in the insulated conductor bars; and the diameter of the screw shank is approximately equal to the diameter of the surrounding opening in each layer of insulation, but quite a bit less than the diameter of the opening in each conductor, thereby to prevent a conductor from shorting out on the screw.

Figure 1:
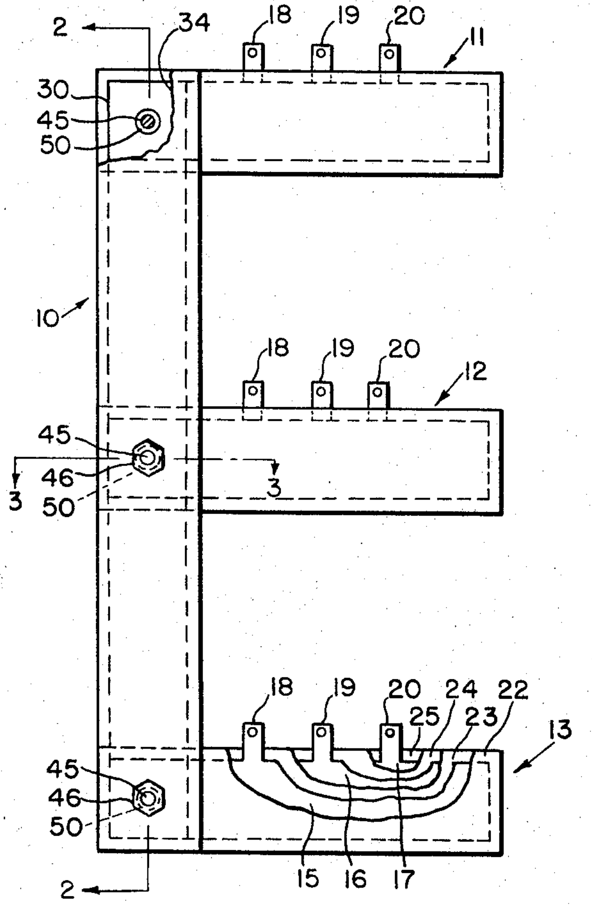
FIG. 1 is a plan view of a plurality of interconnected bus bars made in accordance with one embodiment of this invention, portions of certain of the bars being broken away.

Referring now to the drawing by numerals of reference, 10, 11, 12 and 13 represent four different laminated bus bars, which are electrically connected one to another as below described. The bars 11, 12 and 13 are identical; and each comprises three, elongate, substantially identical, copper conductor strips 15, 16 and 17. These strips, each of which has one or more lateral lugs 18, 19 and 20 projecting from one longitudinal side edge thereof, are secured in generally superposed, insulated relation to one another by four interleaved layers or strips 22, 23, 24 and 25, respectively, of plastic insulating material such as, for example, the type sold under the tradename "Amron." The layers of insulation are similar in configuration to, but slightly wider and longer than, the strips 15, 16 and 17, so that in each bar 11, 12 and 13, the layers of insulation project slightly beyond the peripheral edges of the associated conductors 15, 16 and 17, but not far enough to cover over the associated lugs 18, 19 and 20. Each bar 11, 12 and 13 has a flared end (left end in FIG. 1) at which portions of its conductors 15 and 17 are bent downwardly and upwardly as at 27 and 28 (FIG. 3), respectively, to offset the adjacent ends thereof from the inner or middle conductor 16.

Figure 2:
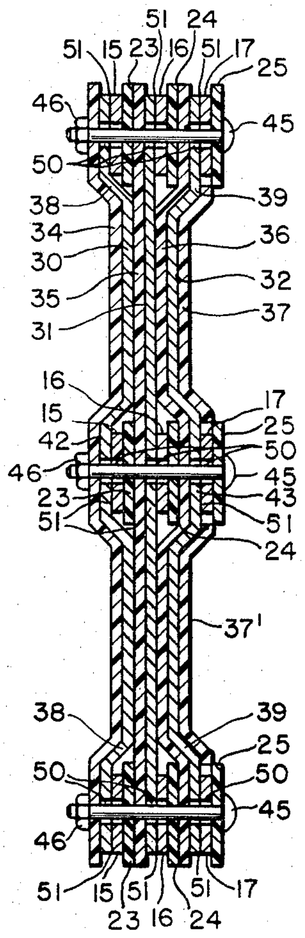
FIG. 2 is a sectional view taken along the line 2—2 in FIG. 1 looking in the direction of the arrows, the thickness of each lamination of the bus bars being exaggerated for purposes of illustration.
Figure 3:
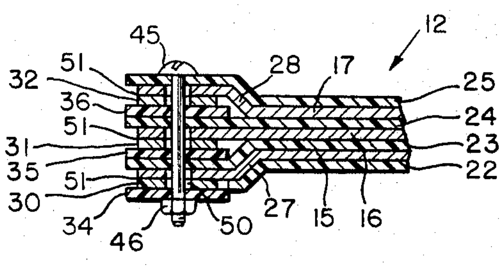
FIG. 3 is a fragmentary sectional view taken along the line 3—3 in FIG. 1 looking in the direction of the arrows.

The bus bar 10 comprises three, elongate, nearly identical conductor strips 30, 31 and 32, which are secured in interleaved registering relation with layers of insulation 34, 35, 36, 37 and 37' (FIGS. 2 and 3). The layers 34 to 37, which may be made of a plastic insulation such as "Amron," are slightly larger than the associated conductors 30, 31 and 32, so that the edges thereof project slightly beyond the marginal edges of these conductors, as in the case of the insulation employed on the bars 11, 12 and 13. The layers 37 and 37', FIG. 2), however cover only upper and lower portions, respectively, of the outside face of conductor 32. Portions of the conductors 30 and 32 are bent upwardly and downwardly as at 38 and 39, respectively, at each end of the bar 10 so that opposite ends of the conductors 30 and 32 are flared or offset from the middle conductor 31. Intermediate their ends the conductors 30 and 32 are also bowed or offset upwardly and downwardly, respectively, from opposite sides of the middle conductor 31 as at 42 and 43, respectively.

In use the flared ends of the bars 11 and 13 are inserted into the flared ends of the bar 10 so that the conductors 15, 16 and 17, and the adjoining insulating strips 23, 24, are interleaved with the conductors 30, 31 and 32 and insulating strips 35, 36 of the bar 10. Similarly the flared end of the bar 12 is inserted into the center of the bar 10 in the area of the bowed portions 42 and 43 of the conductors 30 and 32, so that the flared ends of the bar 12 are nested with the conductors 30 to 32 and the insulating strips 35 and 36.

The flared ends of the bars 11, 12 and 13 are removably secured to the bar 10 by screws 45 and nuts 46. Each screw 45 passes through registering openings formed in the meshed portions of the conductors, and the insulation associated therewith. Each opening in the insulation, through which the shank of a screw 45 passes, is just large enough ot accommodate the shank of the screw. The registering openings in the conductor strips, however, are substantially larger in diameter than the shanks of the screws 45, so that the shank of each screw is spaced as at 50 from each of the surrounding conductor strips.

At each intersection of the bars 11, 12 and 13 with the bus bar 10, the confronting surfaces of the conductors are free of insulation, and are in electrical contact with one another as at 51. Because of these contact areas 51, each conductor 15 is electrically connected to the conductor 30, each conductor 16 is electrically connected to the conductor 31, and each conductor 17 is electrically connected to the conductor 32. In each bar 10 to 13 registering marginal edge portions of the layers of insulation are secured to one another except in the areas where the conductors have exposed contact surfaces 51, and where the edges are separated by the lugs 18, 19 and 20. These layers of insulation not only insulate from one another the confronting faces of the conductors in the bar, but also serve to support the screws 45 centrally of, and spaced from, the sidewalls of the registering holes in each bar. This prevents the screws 45 from shorting out any of the conductor strips, so that the voltages which are applied to the conductors 30, 31 and 32 of the bus bar 10 will appear at the lugs 18, 19 and 20, respectively, of the bars 11, 12 and 13.

If the bar 10 extends for a substantial distance in one direction in the wiring system of a panel or the like, it may have, in addition to its flared ends, a number of points along its length where registering portions of its conductors 30 and 32 are bowed outwardly as illustrated at 42 and 43 in FIG. 2. At each of such points, therefore, a bar similar to the bar 11, 12 or 13 could be connected thereto to form a transverse branch or line for conveying power laterally from the bar 10 to various circuits spaced along the bar 10. This permits the panel to approach more nearly a square configuration rather than an oblong configuration, which would result if, for the same number of circuits, a single laminated bus bar were employed to service these circuits.

While in the embodiment illustrated, each of the bars 10, 11, 12 and 13 comprises only three conductors, it is, of course, anticipated that each bar may be constructed with a greater or lesser plurality of conductor strips. Moreover, while only the bars 11, 12 and 13 have been illustrated with connector lugs 18, 19 and 20, it will be apparent that similar lugs may be employed on the conductors 30, 31 and 32 of the bar 10, if desired. Also the quantity and disposition of these lugs on each of the conductor strips may be varied as desired.

Having thus described my invention, what I claim is:

1. A laminated electrical bus bar comprising
a plurality of elongate, superposed electrical conductor strips,
layers of dielectric material alternating with said conductor strips to insulate said strips electrically from one another, and
at least two further layers of dielectric material secured, respectively, over the outer faces of the two outermost of said strips,
each of said strips having on one side thereof for a portion of its length an exposed surface, which is spaced from the adjacent layer of dielectric material, and which registers with a like, exposed surface on one side of each of the others of said strips,
each of said strips having through said portion thereof an opening which registers with a smaller opening formed in the layer of dielectric material disposed at the opposite side of the strip.

2. A laminated electrical bus bar comprising
a plurality of elongate, superposed electrical conductor strips,
layers of dielectric material alternating with said conductor strips to insulate said strips electrically from one another, and
at least two further layers of dielectric material secured, respectively, over the outer faces of the two outermost of said strips,
each of said strips having on one side thereof for a portion of its length an exposed surface, which is spaced from the adjacent layer of dielectric material, and which registers with a like, exposed surface on one side of each of the others of said strips, and
a further plurality of conductor strips, each of which has an exposed surface removably engaged with one of the exposed surfaces on the first-named plurality of strips, and
a member fastening said further strips to said first-named strips and having a shank passing through registering openings in said layers of dielectric material and said strips,
the openings in said layers of dielectric material being substantially equal in diameter to the diameter of said shank, and the openings in said strips being greater in diameter than the diameter of said shank.

3. In combination,
a pair of laminated bus bars, each of said bars comprising a plurality of elongate, electrical conductor strips secured in superposed relation to one another and alternating with a plurality of layers of insulating material, which insulate said strips from one another, and which completely cover each strip except for at least one exposed portion on one side of each strip,
at least one of each pair of adjacent strips in each bar having said one exposed portion thereof offset in spaced, parallel, registering relation to said one exposed portion on the other of said pair,
one of said bars having said one exposed portion of each of its strips removably positioned in contact with said one exposed portion of each strip of the other of said bars electrically to connect the strips in said one bar with the strips in said other bar, whereby the exposed portions of the strips and adjoining insulating layers of said one bar alternate with the exposed portions of the strips and adjoining layers of said other bar, and
means removably fastening said bars together, including a member having a shank which passes through registering holes in the exposed portions of said strips and said layers of insulating material,
each of the holes in said layers of insulating material being substantially equal in diameter to the diameter of said shank, and each of the holes in said strips being greater in diameter than the diameter of said shank.

4. The combination as defined in claim 3, wherein each of the strips in said one bar has a second exposed portion intermediate its ends, and longitudinally spaced from said one portion, and said second exposed portions are disposed in spaced, parallel, registering relation to one another in said one bar.

References Cited

UNITED STATES PATENTS

| | | |
|---|---|---|
| 3,264,403 | 8/1966 | Erdle. |
| 3,376,377 | 4/1968 | Fehr. |
| 3,383,458 | 5/1968 | Raskhodoff et al. |

DARREL L. CLAY, Primary Examiner

U.S. Cl. X.R.

174—72, 117